United States Patent
Lark

(10) Patent No.: US 11,146,178 B2
(45) Date of Patent: Oct. 12, 2021

(54) CURRENT OUTPUT

(71) Applicant: Pepperl+Fuchs SE, Mannheim (DE)

(72) Inventor: Peter Lark, Manchester (GB)

(73) Assignee: Pepperl+Fuchs SE, Mannheim (DE)

( * ) Notice: Subject to any disclaimer, the term of this patent is extended or adjusted under 35 U.S.C. 154(b) by 4 days.

(21) Appl. No.: 16/629,631

(22) PCT Filed: Jul. 10, 2018

(86) PCT No.: PCT/GB2018/051951
§ 371 (c)(1),
(2) Date: Jan. 9, 2020

(87) PCT Pub. No.: WO2019/012265
PCT Pub. Date: Jan. 17, 2019

(65) Prior Publication Data
US 2021/0143741 A1 May 13, 2021

(30) Foreign Application Priority Data
Jul. 12, 2017 (GB) .................................... 1711245

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
None
See application file for complete search history.

(56) References Cited

U.S. PATENT DOCUMENTS

| 6,333,623 B1 | 12/2001 | Heisley et al. |
| 7,671,575 B1 * | 3/2010 | Suzuki ................... H05B 45/37 323/285 |

(Continued)

FOREIGN PATENT DOCUMENTS

JP    S5813024 A    1/1983

OTHER PUBLICATIONS

International Search Report for International Patent Application No. PCT/GB2018/051951 dated Oct. 15, 2018, 11 pages.

*Primary Examiner* — Jeffrey A Gblende
(74) *Attorney, Agent, or Firm* — Morgan, Lewis & Bockius LLP

(57) ABSTRACT

A current output apparatus adapted for electrical connection to a load to output an electrical current thereto. The apparatus comprises a current output terminal for connecting to a first terminal of the load to pass an electrical current thereto. A current input terminal is provided for connecting to a second terminal of the load to receive said electrical current returned from the load. A voltage regulator is operable to supply to the current output terminal an electrical voltage regulated to differ from an electrical voltage applied to the current input terminal by an amount sufficient to cause said electrical current to flow from the current output terminal to the current input terminal via the load. The voltage regulator is operable and arranged to supply to the current output terminal an electrical voltage of positive polarity or of negative polarity for supplying said electrical current to a load presenting to the current output terminal a voltage of positive polarity or of negative polarity, respectively.

6 Claims, 12 Drawing Sheets

(56) References Cited

U.S. PATENT DOCUMENTS

| | | | |
|---|---|---|---|
| 2007/0052398 A1* | 3/2007 | Hasegawa | H02M 3/1584 |
| | | | 323/282 |
| 2009/0284178 A1* | 11/2009 | Jessenig | H02M 3/156 |
| | | | 315/297 |
| 2018/0006557 A1* | 1/2018 | Yoon | H02M 3/07 |

* cited by examiner

CURRENT OUTPUT

CROSS-REFERENCE TO RELATED APPLICATIONS

This application is a National Phase Application of International Patent Application No. PCT/GB2018/051951 filed Jul. 10, 2018, which claims priority to United Kingdom Patent Application No. 1711245.9 filed on Jul. 12, 2017 entitled "IMPROVEMENTS IN AND RELATING TO CURRENT OUTPUT", incorporated by reference herein in its entirety.

FIELD OF THE INVENTION

The invention relates to electrical current output circuits and methods. In particular, the invention relates to circuitry for supplying power to a load not containing a power source of its own (a 'sink load') or from a load containing a power source of its own (a 'source load'). This invention relates to an apparatus for the output of current to either type of load, as desired, using the self same apparatus. The invention also permits the output of current to source loads while reducing power dissipation within the circuit components of the apparatus.

BACKGROUND

It may often be required to use electronic devices in hazardous environments. Examples include environments containing volatile material. Hazard arises because heat or sparks from electronic devices might cause the volatile material to ignite. Consequently, electronic circuits for use in these hazardous environments are subject to strict safety/protection standards to ensure that such hazards are not realised.

One way of providing such protection is to provide a hazardous load with a galvanically isolated power supply. This is achieved by employing a system of transformer circuits across which power may be transferred from an external power supply to circuitry within the hazardous environment. In order to optimise safety, the current, power, and voltage within the circuit in the hazardous environment should be limited to levels that prevent ignition of the volatile material from heat etc. generated by that circuit.

Where a load requiring a supply of current is a load not containing a power source of its own (a 'sink load'), a dedicated type of current supply circuit is required to meet these needs. In such a circuit, power resulting from the current drawn from the current supply apparatus is substantially dissipated in the load. However, when the load contains a power source of its own (a 'source load'), a different current supply circuit is required. In that case, a greater proportion of power may be dissipated in the current supply apparatus itself. This is undesirable as it is wasteful of energy and results in heating of circuit components of the current supply apparatus, which may damage them.

The invention aims to provide an improved current supply apparatus.

BRIEF DESCRIPTION OF THE INVENTION

At its most general, the invention comprises the supply of current via a current output port at which the polarity of voltage is variable controllably to suit the polarity of voltage of a load connected to that current output port. This allows the current output port to be made suitable for outputting current to either a sink load or a source load, which may present voltages of opposite respective polarities to the current output port when connected to it.

According to the present invention there is provided an apparatus and method as set forth in the appended claims. Other features of the invention will be apparent from the dependent claims, and the description which follows.

In a first aspect, the invention provides a current output apparatus adapted for electrical connection to a load to output an electrical current thereto, comprising a current output terminal for connecting to a first terminal of the load to pass an electrical current thereto. A current input terminal is provided for connecting to a second terminal of the load to receive the electrical current returned from the load. A voltage regulator is provided and is operable to supply to the current output terminal an electrical voltage regulated to differ from an electrical voltage applied to the current input terminal by an amount sufficient to cause the electrical current to flow from the current output terminal to the current input terminal via the load. The voltage regulator is operable and arranged to supply to the current output terminal an electrical voltage of positive polarity or of negative polarity for supplying said electrical current to a load presenting to the current output terminal a voltage of positive polarity or of negative polarity, respectively.

In this way, the polarity and magnitude of a voltage provided at the current output port may be controlled to suit the conditions presented at the current output port when either a source load or a sink load is connected to it. This enables current to flow out of the current output port in supply to the connected load irrespective of whether it is a source load or a sink load. The structure and components of the current supply circuit need not be modified to allow it to be used to supply current to a sink load having previously been used to supply current to a source load, or vice versa. This versatility is particularly beneficial to users who may require the apparatus to be suitable for either use either because they intend to use it to supply different such types of load at different time/locations, or because they do not yet know which type of load will be used in the future.

The current output apparatus may be operable to supply to the current output terminal an electrical voltage of positive polarity when supplying electrical current to a sink load and to supply to the current output terminal an electrical voltage of negative polarity when supplying electrical current to a source load.

In this way, a simple apparatus may be controllable to supply to its current output terminal a voltage of polarity suitable for the type of load (e.g. sink/source) connected to that terminal and to be supplied with current.

The apparatus may provide a voltage, at the output terminal, of variable polarity by combining two DC component voltages of opposite polarity in variable proportions in sequence alternately. The variable proportions (e.g. proportions of time, e.g. in pulse width modulation) may be such that a net polarity provided in this way matches the polarity of the DC component voltage having the greater proportion among the two component voltages so combined. The magnitude of the net voltage may thereby be proportional to, or at least determined by, the difference in magnitudes between the two DC component voltages, and/or the relative proportion of time for which the two DC component voltages are combined, one after the other, in an alternating temporal succession.

The apparatus may provide the two DC component voltages concurrently and simultaneously such that they may be available for combination continuously in time, even though the proportions, or manner of combination, of the two DC component voltages may change over time, if desired.

The voltage regulator may comprise a switching unit arranged to supply an electrical voltage alternately switched between the DC component voltages of positive DC polarity and of negative DC polarity. The voltage regulator may be arranged to supply the electrical voltage of positive DC polarity and the electrical voltage of negative DC polarity alternately for selected respective time periods to a smoothing electrical filter and to output the result to the current output terminal as a DC voltage. In this way, the voltage regulator may include an electrical filter arranged to smooth variations in the electrical voltage output from the switching unit for supply to the current output terminal. This switching operation may be performed by a switch arrangement comprising two switches (e.g. a diode(s), a transistor(s)) operable to switch in opposite relative senses, such that one switch for connecting/supplying the DC component voltage of negative DC polarity may be conductive ('on') when the other switch for connecting/supplying the DC component voltage of positive DC polarity is not conductive ('off'), and vice versa.

The two DC component voltages may have similar or substantially the same magnitude, but opposite polarity. The two DC component voltages may be generated, by the apparatus, as separate DC voltage signals rectified from the same AC voltage signal. The two DC component voltages may preferably be provided by a transformer winding. The apparatus may be arranged for electrical connection to the terminals of a transformer winding and for obtaining the two DC component voltages from the transformer winding. The AC voltage signal may be generated by an AC voltage unit of the apparatus. The AC voltage unit may comprise a transformer winding of a transformer circuit operable to be driven by an AC drive signal to which the transformer circuit is responsive to generate the AC voltage signal.

The current output apparatus may include a synchronous rectifier arranged to rectify an AC voltage signal supplied by a first transformer winding coupled thereto. The synchronous rectifier may comprise transistors arranged to provide full-wave rectification of the AC voltage of the first transformer winding. The synchronous rectifier may thereby provide a flow of current from the first transformer winding during both halves of each cycle of the AC voltage thereof, such that a negative-polarity end of the first transformer winding is presented to the voltage regulator in electrical connection/communication with the current output terminal of the current output apparatus during the full AC cycle of the transformer winding. Thus, as the negative polarity end of the first transformer winding swaps locations from one physical end of the winding to the other, during an AC voltage cycle, then the physical winding end having negative polarity is selected to be the transformer end placed in electrical connection/communication with the current output terminal of the current output apparatus (e.g. via the voltage regulator).

The transistors used in the synchronous rectifier preferably have a structure permitting that current can flow in either direction when the transistor gate is biased. Examples include FETs. A few illustrative examples include: junction FETs (JFET) or Insulated Gate FETs (IGFET) e.g. MOSFETs etc. MOSFETs are preferable because their gate drive is typically easier, there is much more choice of MOSFET designs, and they are generally cheaper than other FETs. The synchronous rectifier may be arranged to supply the rectified voltage to the voltage regulator. The synchronous rectifier preferably comprises field-effect transistors (FETs). The current output apparatus may include a control unit arranged to synchronously control the conductivity of the FETs to supply to the voltage regulator a DC electrical voltage of negative polarity.

The synchronous rectifier may comprise a plurality (e.g. four or more) FETs arranged in a bridge formation. Desirably, the gate terminal of each such FET may be electrically connected to (and are driven by) a respective AC voltage source, such as a transformer winding. The synchronous rectifier may have FETs arranged in pairs whereby each pair is in (or is arranged for) series electrical connection with a respective one of the two opposite-polarity output terminals of the AC voltage source (e.g. winding). Preferably, the drain terminal of each FET of each pair of FETs is in (is arranged for) electrical connection to the respective output terminal of the AC voltage source (e.g. one winding end) to which the pair in question is in (or arranged for) electrical connection with. Preferably, the source terminal of each FET of a given pair of FETs are in (or are arranged for) electrical connection to a respective one of: the voltage regulator; a ground terminal. Desirably, in a pair of such FETs the FET arranged for electrical connection to the ground terminal is a p-type FET. Desirably, in a pair of such FETs the FET arranged for electrical connection to the voltage regulator is an n-type FET. Desirably, in each of two pairs of such FETs the FETs are arranged to permit them to be driven such that current flows via the p-type FET of one pair of FETs to the n-type FET of the other pair of FETs. Desirably, two pairs of FETs may be driven such that current is received at the source terminal of the p-type FET of one pair of FETs and is output via the source terminal of the n-type FET of the other pair of FETs. Desirably, the gate terminals of each pair of FETs are driven in synchrony and in unison. Desirably, the gate terminals of different pairs (e.g. two pairs) of such FETs are driven in anti-phase by the AC voltage source such that the drains of one pair of FETs connected to one voltage terminal (e.g. winding end) of the AC source is driven "on" while the gate terminals of the other pair of FETs connected to the other terminal of the AC source (e.g. the other winding end) is driven "off", and vice versa in alternation. This provides synchronous rectification capacity.

The current output apparatus may include a further rectifier electrically coupled to the first transformer winding and arranged to rectify an AC voltage signal supplied by the first transformer winding coupled thereto, and to supply the rectified voltage to the voltage regulator as a DC electrical voltage of positive polarity. Passive diodes may be employed for this purpose e.g. arranged to provide a full-wave rectifier such as a bridge rectifier.

The control unit may be arranged to be electrically connected to, or may include, a second transformer winding coupled to (or for coupling to) the gate terminals of the FETs of the synchronous rectifier. The polarity of voltage at the second transformer winding may be controlled/controllable to be opposite to the polarity of voltage at the first transformer winding. The control unit may be arranged to apply a positive-polarity voltage to the gate terminals of FETs of the synchronous rectifier. The transistors in question may be electrically coupled to an end of the first transformer winding. The aforesaid positive gate voltage may be applied when that end of the first transformer has a negative-polarity voltage (e.g. the aforesaid opposite polarity of voltage). Accordingly, a negative-polarity voltage of the first transformer winding may thereby be presented to the voltage regulator for use in providing a voltage at the current output terminal.

The current output apparatus may include a current controller electrically connected to the current input terminal and arranged for regulating the magnitude of the returned electrical current to substantially match a predetermined magnitude.

The voltage regulator may be electrically connected to the current input terminal thereby to receive the voltage thereat as an input signal, and to regulate the voltage supplied to the current output terminal according to the voltage at the current input terminal, such that power dissipated in the current controller is regulated (e.g. most preferably minimised).

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION

Figure 1:
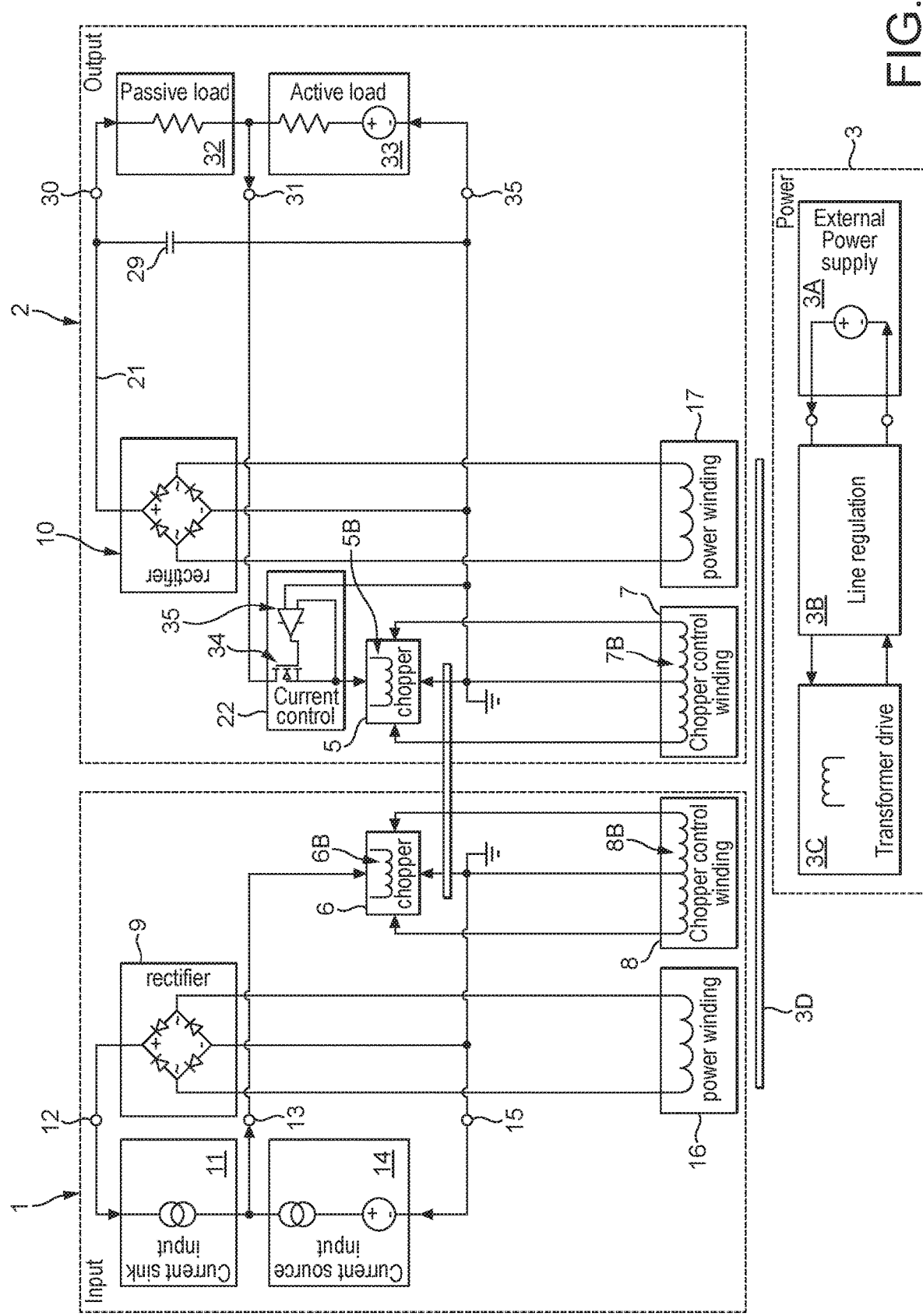
FIG. 1 schematically shows a current output apparatus.

In the drawings, like items are assigned like reference numerals for consistency.

FIG. 1 schematically shows a current output apparatus for transferring electrical current between a current input circuit region 1 and a current output circuit region 2 in galvanic isolation from the input region. Electromagnetic coupling between the current input and output circuits is provided by a transformer comprising a chopper winding 5B of a chopper unit 5 arranged in the current output circuit region which is electromagnetically coupled to a chopper winding 6B of a chopper unit 6 arranged in the current input circuit region. The chopper unit 5 of the current output circuit region is electrically connected to, and functionally controlled by, a chopper control unit 7 which comprises a chopper control winding 7B (a centre-tapped transformer winding). The chopper control winding 7B is electromagnetically coupled to a transformer drive winding 3C of a power circuit region 3 with which, collectively, it defines a transformer.

The chopper unit 6 of the current input circuit region is electrically connected to, and functionally controlled by, a chopper control unit 8 which comprises a chopper control winding 8B (a centre-tapped transformer winding). The chopper control winding 8B is electromagnetically coupled to the transformer drive winding 3C of the power circuit region 3, with which it collectively defines a transformer. Power is delivered to the chopper control winding units (7, 8) from an external power supply 3A of the power circuit region, via a line regulation unit 38, and thence the transformer winding 3C of the power circuit. The line regulation unit 3B serves to regulate the power so supplied and may be any suitable power regulator such as would be readily apparent and available to the person of ordinary skill in the art.

The transformer drive winding 3C not only supplies power, in galvanic isolation, to the chopper control units (7, 8) of the current input and output circuit regions (one, 2), but also supplies power to a power transformer winding 16 of the current input circuit region 1, and concurrently to a power transformer winding 17 of the current output circuit region 2. The transformer drive winding forms a transformer arrangement, electromagnetically coupled in galvanic isolation, with each of the power transformer windings (16, 17) of the current input circuit and output circuits in unison thereby being able to supply power from the external power supply, to both the current input and current output circuits simultaneously. The 2 terminals of the power windings (16, 17) of the current input and output circuits, respectively, are each in electrical connection to a respective full-wave bridge rectifier circuit (9, 10) of the current input or output circuits in question.

This enables the AC current output from a given connected power winding (16, 17) to enter the associated full-wave bridge rectifier (9, 10) and the output therefrom as a rectified current. The anodes of the bridge rectifier (9, 10) not connected to a terminal of a respective power winding (16, 17) are connected to a grounded terminal, whereas the cathodes of the bridge rectifier is (9, 10) not connected to a terminal of a respective power winding (16 or 17) are electrically connected to a current output terminal (12, 30). In the case of the current input circuit region 1, the cathodes in question define a bridge rectifier current output port 12 for electrical connection, in use, to a current sink input 11 part of the input circuit area. This current sink input part draws current from the power winding 16 which supplies current to the bridge rectifier circuit 9, and subsequently the current sink input part directs current out to a current input port 13 of the chopper unit 6 of the current input circuit region 1.

The current provided to the chopper unit 6, by the current sink input 11, is then employed by the chopper unit 6 and its chopper winding 6B, to electromagnetically generate a corresponding current signal within the chopper winding 5B of the corresponding chopper unit 5 in the current output to region with which it collectively forms a transformer. In this way, the chopper unit 5 of the current output circuit area 2 acts as a "current follower" which reproduces the current signal provided by the current sink input 11 of the current input circuit region galvanic isolated from it. Similarly, in the case of the current output circuit region 2, the cathodes of the full-wave bridge rectifier unit 10, which are not electrically connected to the power winding 17 of the current output circuit, form a current output port 30 of the rectifier. This current output port is in electrical connection, in use, to a current "sink" load (or "passive" load) 32. This current sink load draws current, via the bridge rectifier unit 10, from the power winding 17 which supplies current to the bridge rectifier 10 of the current output circuit region 2. The current sink load subsequently directs current into a current input port 31 of the current output circuit region. This current input port is electrically connected, via a current control unit 22, to a current input port of the chopper winding 5B of the chopper circuit 5 in the current output circuit region thereby enabling electromagnetic coupling between the current input circuit region 1 and the current output circuit region 2 to allow the current in the latter to "follow" the current in the former.

The current controller unit 22 comprises a variable impedance unit 34, in the form of a FET, having a drain terminal connected to the current input terminal 31 to receive current from the "sink" load, and a source terminal connected to the chopper unit 5 to provide signals thereto. In particular, the chopper control winding drives the chopper to chop the signal current. The gate terminal of the FET 34 is connected to the output port of a differential amplifier 35, and the differential amplifier inverting and non-inverting input ports are electrically connected to the source terminal of the FET 34 and to a grounded terminal, respectively. Thus, the output signal generated by the differential amplifier is proportional to a voltage drop across the variable impedance of the FET which, in turn, determines the signal supplied to the gate terminal of the FET to control its impedance, as a feedback loop. This serves to maintain at a steady, predetermined level, or within a desired range, the current passing to the chopper unit 5 of the current output circuit region. In particular, the differential amplifier (op amp) is arranged to control the gate voltage of FET 34 to minimise its source voltage and hence the voltage on the chopper and the chopper winding, to maximise the accuracy. The chopper unit 6 in the current input circuit region 1 chops to ground and has little DC voltage across it, in practice. The chopper unit 7 in the current output circuit region 2, is also controlled to 0V DC for symmetry and therefore current transfer accuracy between input and output.

The description of the set-up of FIG. 1 has so far been described in terms of current transfer from a current sink input 11 in the current input circuit region 1, to a current "sink" (passive) load in a galvanic isolated current output circuit region. However, output of current may also be achieved when the current sink input 11 is replaced with a current source input 14 and, concurrently, the passive "sink" load 32 is replaced with an active load (a current "source" load) 33. These source/active inputs and loads contain their own power sources (as indicated in FIG. 1) and thereby render the power windings (16, 17) and associated bridge rectifier circuits (9, 10) of the current input and output circuit regions (1, 2) redundant. Instead, a current input terminal of the current source input 14, and the current source load 33, is connected to a respective grounded terminal (15, 35) of the current input and current output circuit regions, and the current output terminals of the current source input/load (14, 33) is connected to a respective chopper circuit (6, 5) of the current input/output circuit region in question. Thus, an "active" load 33 cannot be connected to the current output port 30 of the current output circuit region and a "passive" load cannot be connected to the current output port 35 of the current output circuit region. A single pair of current input and output ports cannot serve both types of load ("active" and "passive").

This illustrates the principle of the limitation also found in other current output circuits, of whatever form and structure different to FIG. 1 which may be available to the skilled person.

Figure 2:
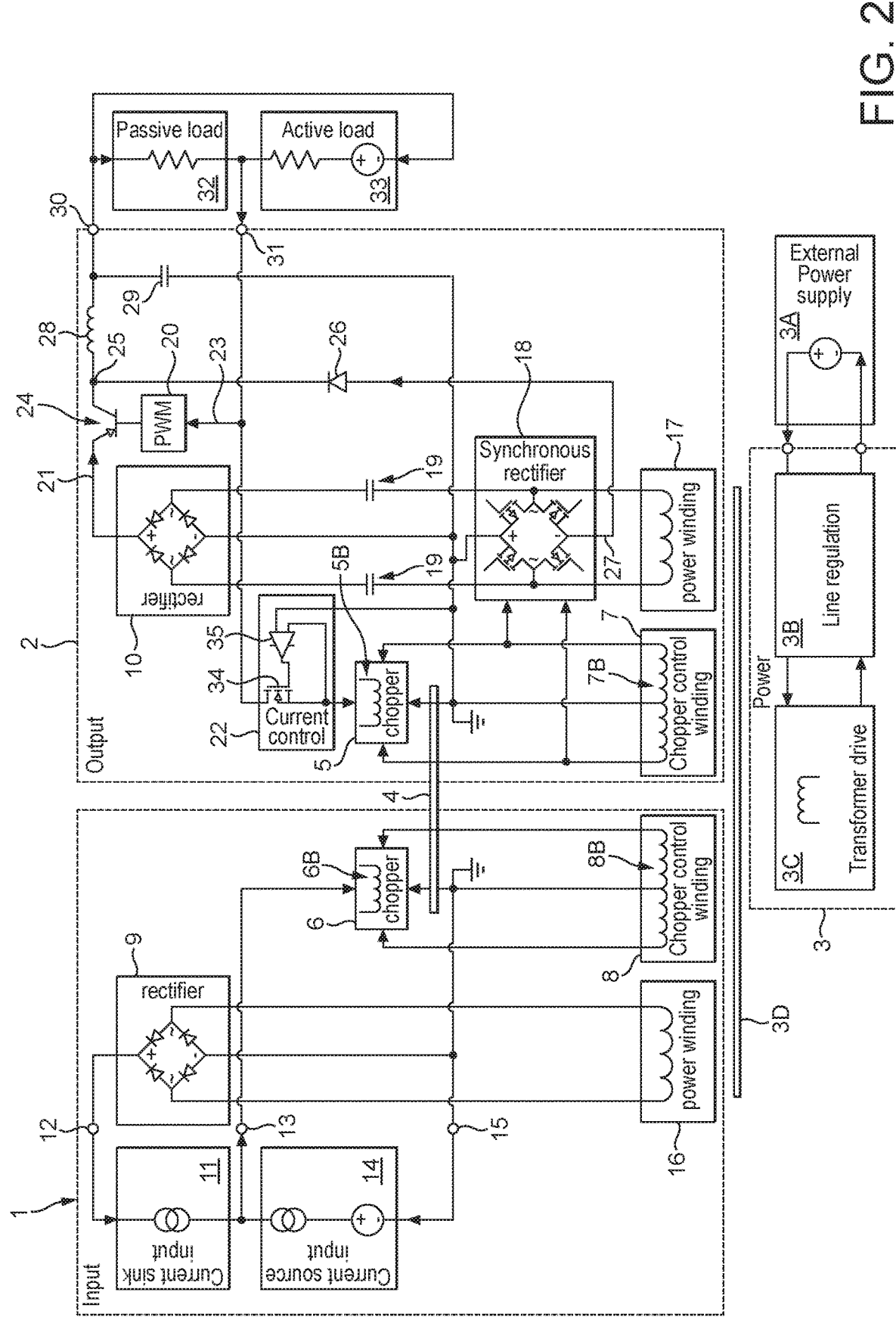
FIG. 2 schematically shows a current output apparatus according to an embodiment of the invention.

Referring to FIG. 2, there is shown an embodiment of the invention, in schematic form, which is presented as a modification to the schematic circuit of FIG. 1 in order to better aid an understanding of the invention in particular, the current output part of the current output apparatus of FIG. 1 further comprises a synchronous rectifier unit 18, a pulse-width modulation (PWM) unit (20, 24) and an electrical smoothing filter unit (28, 29). Diode 26 permits the inductor current to flow from the synchronous rectifier 18 towards the electrical smoothing filter (28, 29) whilst the PWM transistor 24 is off.

The synchronous rectifier unit 18 comprises 4 field-effect transistors (FETs) arranged in a bridge formation such that the drain terminal of each FET is connected electrically to a respective end of the power winding 17 of the current output circuit region. A first pair of FETs of the four FETs of the synchronous rectifier 18 each have their drain terminal electrically connected to one end of the power winding 17, whereas a second pair of the FETs, comprising the other two FETs of the four FETs, each has their drain terminal electrically connected to the other end of the power winding 17. One FET of the first pair of FETs one FET of the second pair of FETs has its source terminal connected to a grounded line/terminal of the current output circuit region. One other FET of the first pair of FETs and of the second pair of FETs has its source terminal electrically connected (indirectly) to the current output terminal 30 of the current output circuit region via the electrical smoothing filter unit (28, 29). And intermediate diode 26 is placed between those FET source terminals and the electrical smoothing filter with its anode in connection with the former and its cathode in connection with the latter thereby to permit the inductor current to flow from the synchronous rectifier 18 towards the electrical smoothing filter (28, 29) whilst the PWM transistor 24 is off. That is to say, when the PWM transistor 24 transitions from an 'on' state to an 'off' state, the resulting rapid fall in current (dI/dt) at the inductor input terminal 25 induces a voltage (V=−LdI/dt) there arising from the inductance (L) of the inductor. The switch mode inductor will resist a change of current with a "back emf" of V. Thus, when a positive voltage ($V^+$) is applied that ramps the current up $\delta i=(V^+ - V_{out})\delta t/L$, the voltage on the capacitor 29 will increase. Then a negative voltage ($V^-$) is applied that ramps the current down $\delta i=(V^- - Vout)\delta t/L$, the voltage on the capacitor 29 will decrease. At a steady output the two δi values will tend to be equal and opposite but the δt values are controlled to keep a suitable voltage on the capacitor. The PWM mixing is achieved by ramping the inductor current up and down which has the effect of mixing the two voltages onto the output capacitor 29.

This induced "back emf" places a forward-bias voltage at the diode 26 rendering it conductive and permitting current to flow through it from the synchronous rectifier to the electrical smoothing filter (28, 29). In alternative embodiments, this switching operation may be performed by another switch arrangement (e.g. a transistor(s)) controllable to be conductive ('on') when the PWM switch 24 is 'off'. In this way, a switching operation is performed by a switch arrangement comprising two switches (e.g. a diode 26, a transistor 24) operable to switch in opposite relative senses, such that the switch 26 for connecting/supplying the DC component voltage of negative DC polarity to the smoothing unit (28, 29) is conductive ('on') when the other switch 24 for connecting/supplying the DC component voltage of positive DC polarity to the smoothing unit (28, 29), is not conductive ('off'), and vice versa.

Capacitors 19 are positioned between the full-wave bridge rectifier unit 10 and the ends of the power winding 17 to which it is connected. These capacitors 19 couple the AC voltage from power winding 17 to rectifier 10 to avoid the need for separate windings for (positive voltage) rectifier 10 and (negative voltage) rectifier 18

The gate terminals of the FETs of the first pair of FETs are each connected in common to one end of the chopper control winding 7B of the chopper control unit 7, whereas the gate terminals of the FETs of the second pair of FETs are each connected in common to the other end of the chopper control winding 7B of the chopper control unit. As a result, in operation, the voltage applied to the gate terminals of the first pair of FETs is in anti-phase (i.e. opposite polarity) with the voltage applied to the gate terminals of the second pair of FETs. This also means that the synchronous rectifier unit 18 is driven in synchrony with the chopper control winding and the chopper unit 5.

The PWM unit (20, 24) is arranged to receive two input signals. A first input signal 23 is the voltage level present at the current input terminal 31 of the current output circuit region, and a second input signal 21 is the current output from the full-wave bridge rectifier unit 10. The PWM unit includes a switch 24 arranged to apply the second input signal 21 to the output port 25 of the PWM unit depending on the value of the first input signal 23. When the switch is rendered conductive, then the voltage 21 from the full-wave bridge rectifier is applied to the current output port of the PWM unit, and thence to the input port 25 of the electrical smoothing filter to which the PWM unit has its output port connected. When the switch is rendered non-conductive, the voltage output from the synchronous rectifier 18 is applied to the input port 25 of the electrical smoothing filter (28, 29). The magnitude and polarity of the voltage at the output of the electrical smoothing filter (28, 29) presented to the current output port 30 of the current transfer circuit region 2 is controlled by the PWM 20 duty ratio.

The terminal of the full-wave bridge rectifier unit 10 from which the PWM unit (and the electrical smoothing filter) receives input current, has a positive voltage polarity, whereas the terminal of the synchronous rectifier unit 18 from which the smoothing filter receives input current has a negative voltage polarity. The PWM unit operates to combine voltage of positive polarity with the voltage of negative polarity alternately for controlled periods of time such that the voltage thereby input to the electrical smoothing filter input terminal 25 presents an output voltage which, when smoothed by the smoothing filter, has a polarity and magnitude determined by the duration of periods of time over which the voltages were combined. That is to say, the temporal width, or duty ratio, of the switch 24 of the PWM unit (20, 24) controllably determines the magnitude and polarity of the voltage (derived from the bridge rectifier 10 and the synchronous rectifier 18) presented to the current output port 30 of the current transfer circuit region 2.

As a result, it is possible to controllably vary the magnitude and polarity of the voltage at the current output port 30 in a way which makes it suitable to be connected to either the current input port of a "passive"/"sink" load 32 (typically of positive polarity) or to the current input port of an "active"/"source" load 33 (typically of negative polarity). Both an "active" and a "passive" load are shown in such connection in FIG. 2, for illustrative purposes. In use, however, the load would be typically one type or the other, separately, not both at the same time.

Figure 3:
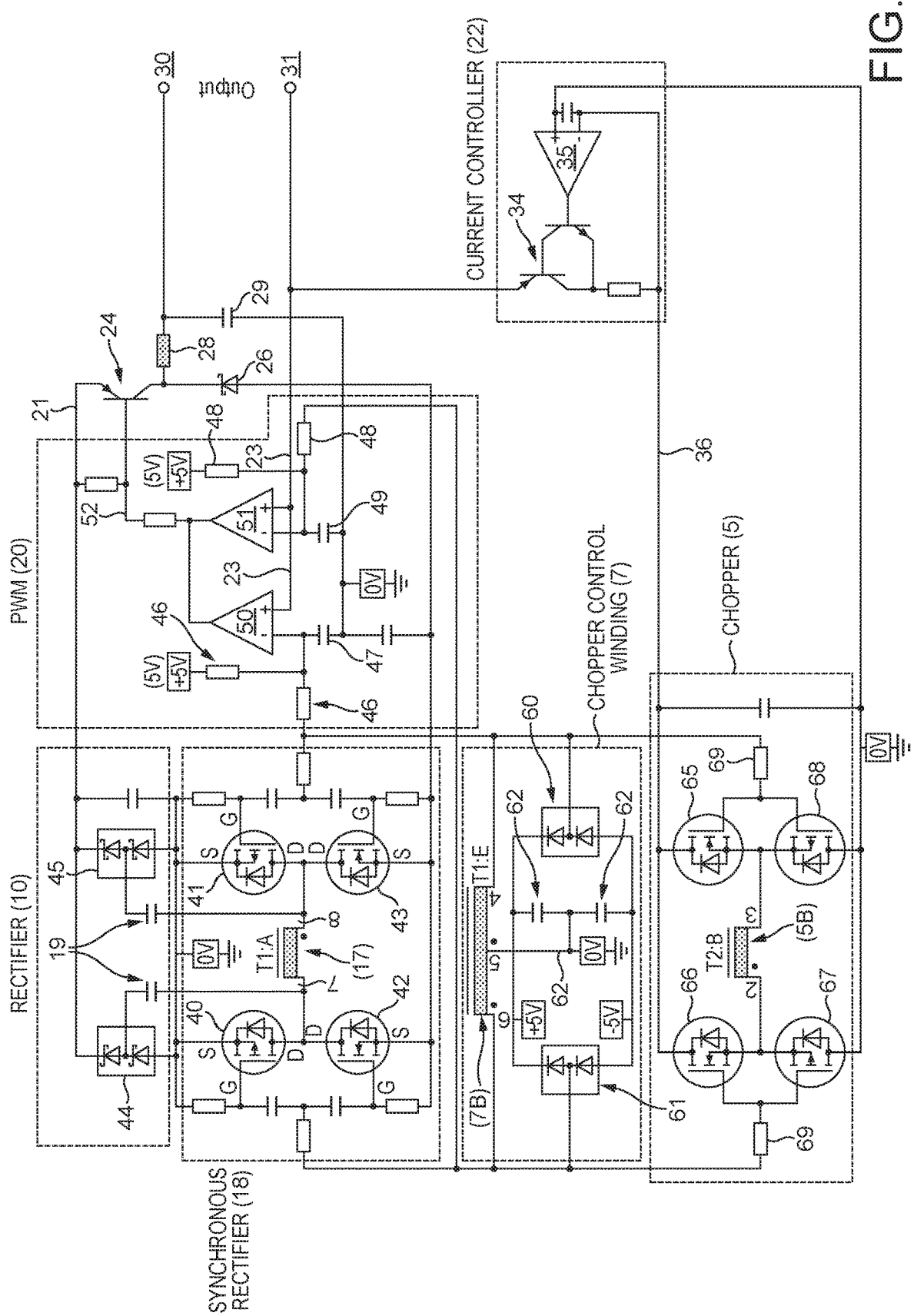
FIG. 3 shows a circuit design for relevant parts of the current output circuit of the apparatus of FIG. 2, according to an embodiment of the invention.

FIG. 3 illustrates a circuit diagram showing elements of the current output circuit region 2 of the schematic diagram of FIG. 2.

The chopper control winding 7B comprises a centre-tapped winding with its terminal connected to a grounded line. Two pairs of diodes (60, 61) connected to the chopper control winding 7B are also connected to both the +5 volt rail and the −5 volt rail. A first pair of these diodes 60 comprises two diodes connected in series with the cathode-terminating being connected to the +5 volt rail whilst the anode-terminating end of the pair is connected to the −5 volt rail. The same arrangement is in place for the other pair of diodes 61 of the two pairs. Smoothing capacitors 62 are connected to a respective one of a +5 volt rail and a −5 volt rail and a grounded line. It is to be noted is that a voltage of other than +/−5 volts may be supplied to the rails described above.

A respective one of each of the two ends of the centre-tapped chopper control winding 7B is electrically connected to a respective one of the two pairs of diodes (60, 61) at a point between them, and is also electrically connected to the gate terminals of field-effect transistors (FETs: 65, 66, 67, 68) of the chopper unit 5. The chopper unit 5 comprises a chopper winding 5B the terminal ends of which are electrically connected to the source terminals of each respective FET of the two pairs of FETs (66, 67:65, 68) connected to opposite respective ends of the chopper winding 5B. The drain terminals of one FET (67, 68) of both of the two pairs of FETs is connected to a ground rail of the current output circuit region 2, whereas the drain terminals of the other one FET (65, 66) of both of the two pairs of FETs is connected to the current output port of the variable impedance unit 34 of the current controller, therefrom to receive current input to the current input terminal 31 of the circuit, from the load (source load or sick load) connected thereto, in use.

A resistor 69 connects the gate terminals of each respective pair of the two pairs of FETs either side of the chopper winding 5B. Voltage from the chopper control winding 7B is fed to the gate terminals via resistors 69 to control the conductivity of the FETs in question so as to operate the chopper accurately.

Notably, the terminal ends of the chopper control winding 7B are connected not only to the FETs of the chopper unit 5, but are concurrently connected to the gates "G" of the FETs (40, 41, 42, 43) of the synchronous rectifier unit 18 described above. This allows a gate voltage signal to be supplied to the gates of the FETs of the synchronous rectifier unit via intermediate resistors and capacitors connected between the chopper control winding 7B and the FET gate terminals of the synchronous rectifier unit 18, as illustrated in FIG. 3. It is to be noted that the connection (source terminals and drain terminals) of the FETs of the synchronous rectifier 18 is different to that of the FETs of the chopper circuit 5, relative to the respective transformer windings they serve. Operation of the synchronous rectifier unit 18 and of the full-wave bridge rectifier unit 10 will now be described in detail with reference to FIG. 4A and FIG. 4B and with reference to FIG. 5A to 5E, respectively.

FIG. 3 shows the main circuit components of the current output circuit of FIG. 2 in more detail.

The synchronous rectifier (18) comprises an arrangement of four field-effect (FED) transistors (40, 41, 42, 43) arranged in a bridge formation. The drain terminal of each of the 4 transistors is connected to the power winding (17) of the current output circuit with one pair (40, 42) of the 4 transistors connected in this way to one end of the power winding, and the other pair (41, 43) of the 4 transistors connected to the other end of the power winding. Within each such pair of transistors, one of the two transistors of the pair is a P-type transistor arranged such that the source terminal of that transistor is connected to the ground rail of the current output circuit while the other transistor of the pair is an N-type transistor arranged such that the source terminal of that transistor is connected to the output port 30 of the current output circuit via the Schottky diode 26, and the smoothing circuit (28, 29) of the current output circuit described with reference to FIG. 1, above.

The gate terminal of each transistor of the four transistors of the synchronous rectifier is connected to the unrectified output signal of the chopper control winding 7B. Each transistor of the first pair (40, 42) of transistors of the synchronous rectifier each has its transistor gate terminals connected to one end of the chopper control winding 7B, while each transistor of the second pair (41, 43) of transistors of the synchronous rectifier each has its transistor gate terminals connected to the opposite end of the chopper control winding 7B.

Consequently, as the voltage of one end of the chopper control winding 7B alternates in polarity, that end provides a sequence of voltage pulses of the alternating polarity in anti-phase with polarity of voltages provided at the other end of the chopper control winding 7B. Thus, voltage signals of opposite polarity, alternating in time, are fed respectively to the gate terminals of the first pair (40, 42) of the transistors of the synchronous rectifier 18, and concurrently to the gate terminals of the second pair (41, 43) of the transistors of the synchronous rectifier. The consequence of these opposite polarities at the gate terminals of the synchronous rectifier transistors permits the transistors to provide a synchronous rectification of the alternating voltage provided at the power winding 17 to which the synchronous rectifier is connected. Because the transistors of the synchronous rectifier are field-effect (FED) transistors, electrons can flow through those transistors in either direction through the channel (resistive channel) created in any one of the FET transistors when switched "on" by application of an appropriate voltage signal to the gate terminal of the transistor in question. This property of the FET transistors is exploited to enable current to be drawn through the power winding 17 when the voltage of the power winding is negative in polarity. The result is that the synchronous rectifier 18 is able to provide a rectified negative voltage from the voltage provided at the power winding, for output to the output terminal 30 of the current output circuit as necessary when a source load is connected thereto.

A property of P-type FET transistors is that they are rendered non-conductive when the polarity of the voltage applied to the gate terminal of the transistor is positive, but are rendered conductive when the polarity of the gate voltage is negative. Conversely, a property of N-type FET transistors, in this regard, is the opposite. In particular, for N-type FET transistors, when the voltage applied to the gate terminal is negative in polarity the transistor is rendered non-conductive, whereas it is rendered conductive by application of a positive voltage. This means that, in the arrangement shown in FIG. 3 in which each transistor of a given pair of transistors (one of N-type, the other of P-type) has its gate terminal arranged to receive a common voltage from the chopper control winding 7, when the polarity of the chopper control voltage is positive the P-type FET of the transistor pair is rendered nonconductive, whereas the N-type transistor of the pair is rendered conductive.

Conversely, when the polarity of the chopper control voltage is negative, the P-type FET of the transistor pair is rendered conductive, whereas the N-type transistor of the pair is rendered non-conductive. Consequently, at any given instant in time, the P-type FET transistor of one of the 2 transistor pairs, which connects one end of the power winding 17 to ground, is conductive, and the N-type FET transistor of the other pair of transistors, which connects the opposite end of the power winding 17 to the output terminal 30 of the circuit, is also conductive. The 2 conductive FET transistors enable electrical connection to be formed between the ground rail of the current output circuit and the current output port 30 of the circuit, via the power winding 17. Because each FET transistor has a property of enabling current flow in either direction, when in the "on" state (i.e. one conductive), this means that the power winding 17 may be rendered electrically connected to (i.e. in communication with) the output terminal 30 of the current transfer circuit when the polarity of the power winding is negative, thereby presenting a negative polarity voltage to the output terminal 30 of the current output circuit.

Figure 4A:
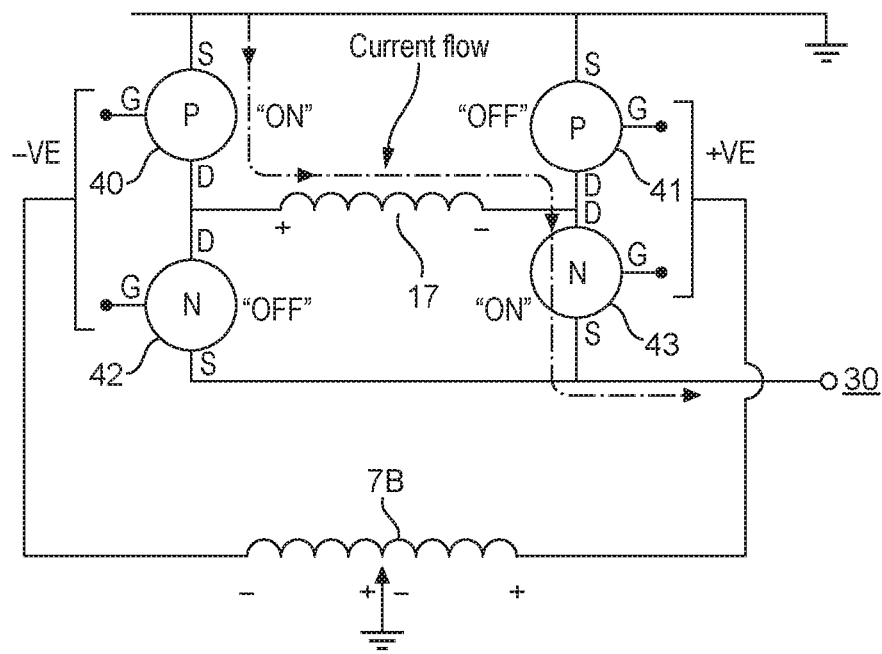
FIGS. 4A and 4B each schematically show an operation of a synchronous rectifier of embodiments of the invention.
Figure 4B:
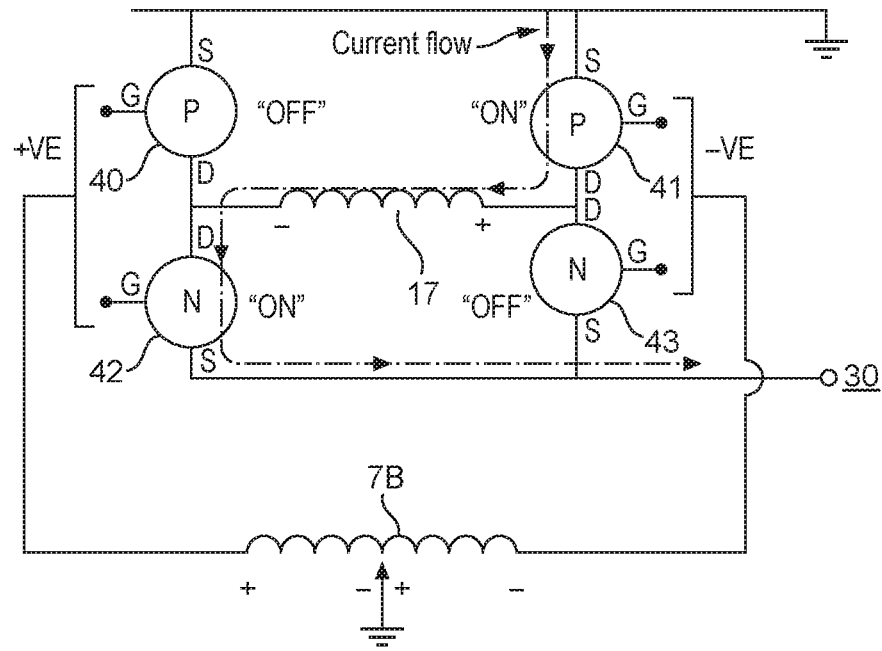

FIGS. 4A and 4B schematically show this synchronous operation of the synchronous rectifier 18 as driven by the chopper control winding 7B. It is to be noted that, at any given time, the polarity of the chopper control winding is opposite to the polarity of the power winding 17. This ensures that a positive gate voltage is applied to the transistors of the synchronous rectifier which are electrically coupled to an end of the power winding which, at that time, has the opposite polarity of voltage. This ensures that the negative-polarity end of the power winding is always presented to the output port 30 of the current output circuit by the FET transistors synchronously controlled by the chopper control winding 7B.

Figure 5A:
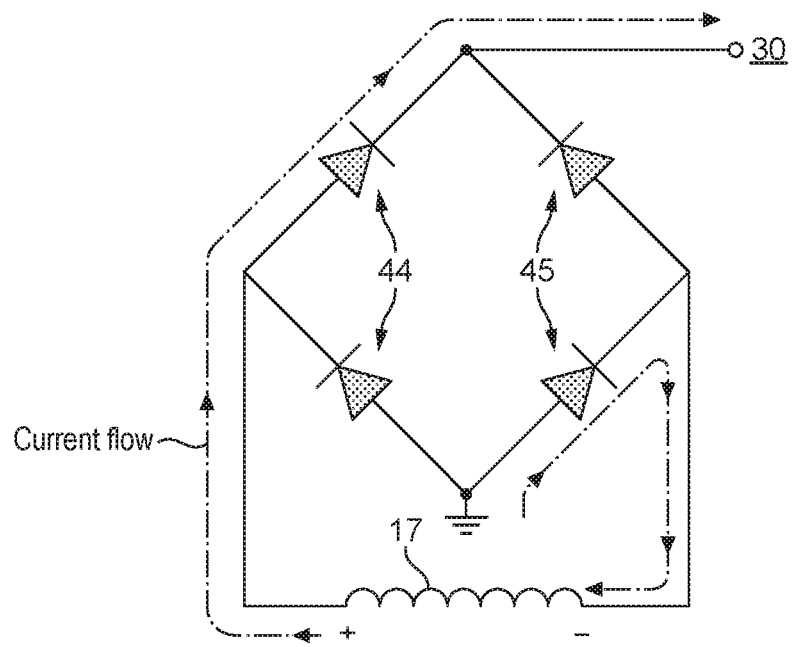
FIGS. 5A and 5B each schematically show an operation of a bridge rectifier of embodiments of the invention.
Figure 5B:
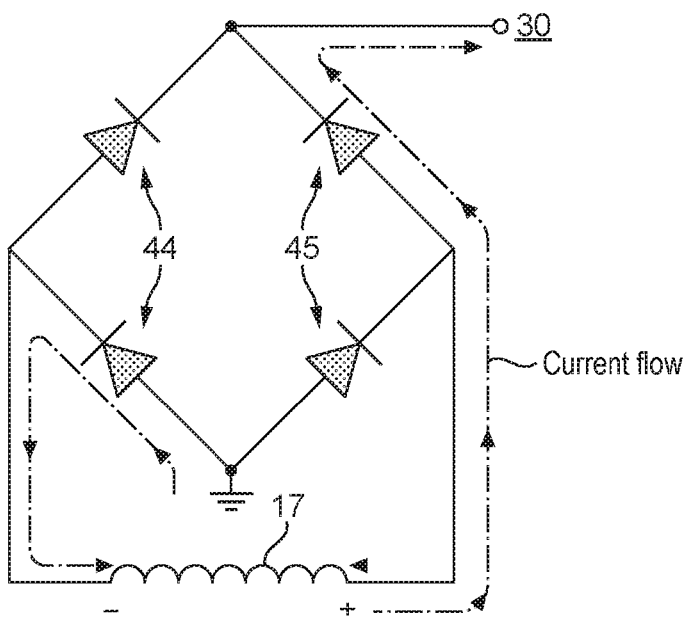

This operation is to be contrasted with the operation of the full wave bridge rectifier 10 of the current output circuit which is able only to provide a rectified voltage of positive polarity at the output terminal 30 of the current output circuit. This is because of the ability of diodes (44, 45) to conduct in one direction when the voltage across them is of the appropriate polarity. In particular, as is schematically shown in FIGS. 5A and 5B, only when the polarity of the voltage applied to anodes of the rectifier 10, by an end of the power winding 17, is of positive polarity, will those diodes conduct. This means that current flow through the rectifier 10 is only permitted in such a way as to present a positive polarity end of the power winding 17 to the output terminal, and a negative polarity end of the power winding cannot be coupled to the output port 30. In this way, the result is that the rectifier 10 of the current supply circuit is able only to provide a positive voltage at the output port 30 of the current supply circuit.

Thus, the effect of providing the synchronous rectifier circuit 18, driven by the chopper control winding 7, as described above, is to enable a rectified voltage of negative polarity to be presented to the output port 30 of the current supply circuit, when it is appropriate to do so, such as when a source load is connected between the output and input terminals (30, 31) of the circuit, and to present to that output port a rectified voltage of positive polarity when a sink load is connected instead.

Figure 5C:
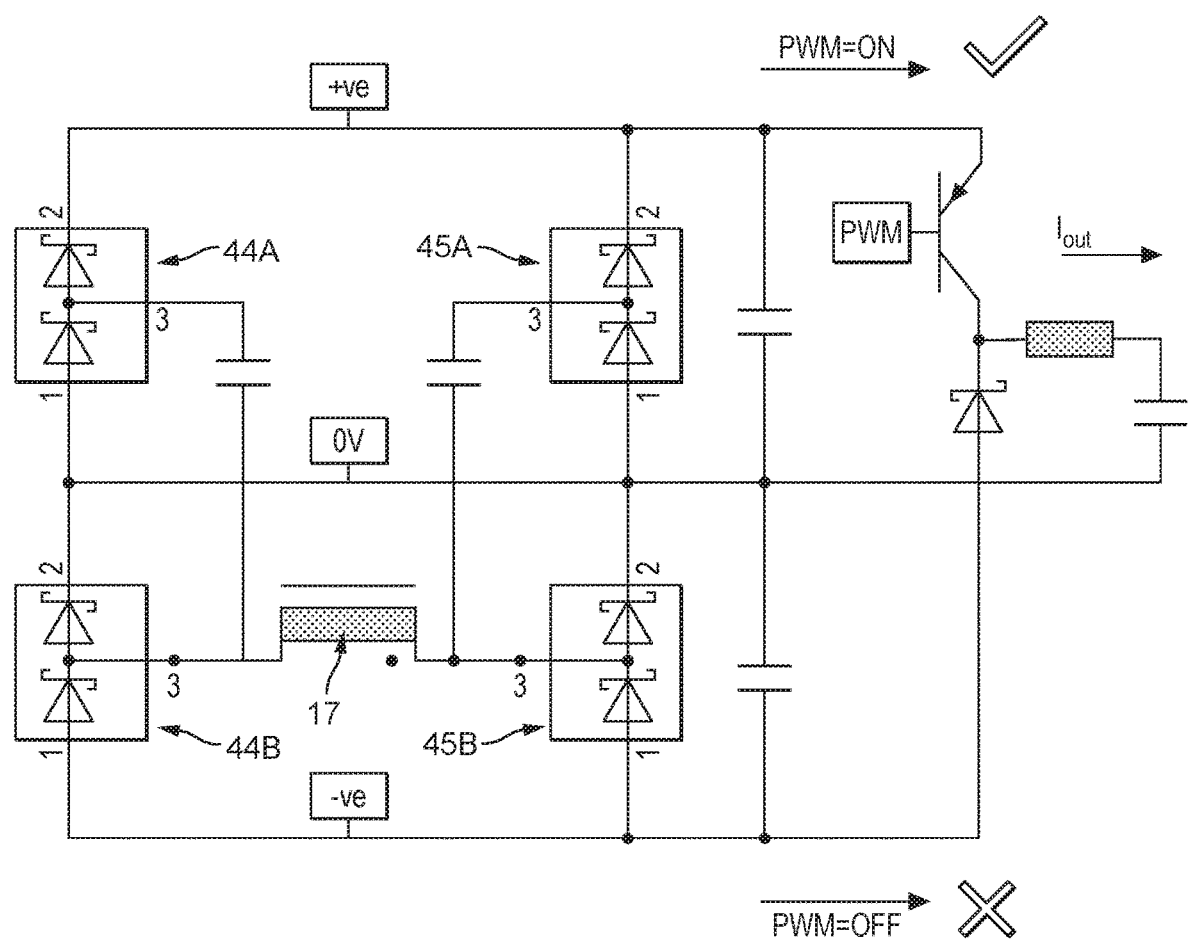
FIG. 5C schematically shows an operation of two bridge rectifiers.
Figure 5D:
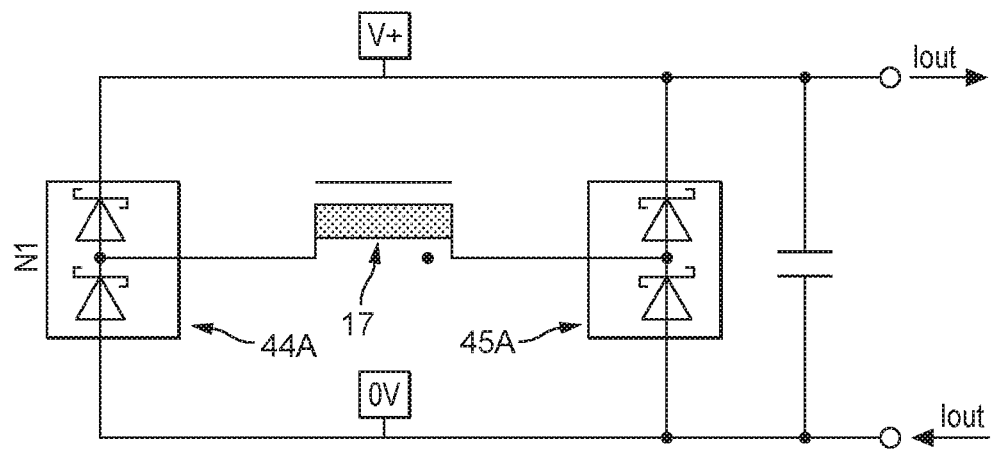
FIGS. 5D and 5E each schematically show an operation of a respective one of the two bridge rectifier of FIG. 5C.
Figure 5E:
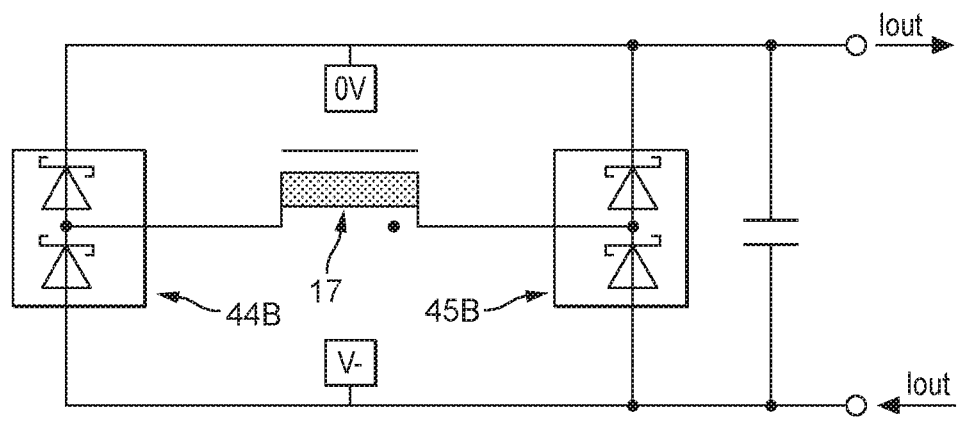

FIGS. 5C to 5E schematically illustrate how a second full-wave bridge rectifier cannot replace the synchronous rectifier unit 18 in a way which will provide the functionality of the synchronous rectifier unit 18 described above with reference to FIGS. 2 and 3. Referring to FIG. 5C, this shows an arrangement in which the synchronous rectifier 18 of FIGS. 2 and 3, it was placed by another full-wave bridge rectifier. The result is a first bridge rectifier comprising 2 pairs of diodes (44A, 45A) with terminating cathodes connected to a positive voltage rail and terminating anode is connected to a grounded rail ("0 v"). Concurrently, a 2nd bridge rectifier comprises 2 pairs of diodes (44B,45B) with terminating cathodes connected to a negative voltage rail and terminating anode is connected to the grounded rail.

The power winding 17 is connected, at each end, to a respective one of the two pairs of diodes of both bridges. When the PWM unit is "on", current (Iout) may flow from the first bridge to the electrical smoothing filter, and may be returned via the grounded rail of the bridge, as FIG. 5D shows schematically. However, when the PWM unit is "off", and prevents current flowing from the first bridge to the electrical smoothing circuit, there can be no current flow in the same direction from the 2nd bridge rectifier (44B, 45B) as indicated in FIG. 5C. This is because current (Iout) may only flow out from the grounded rail and return via negative voltage rail as indicated in FIG. 5E. This is quite contrary to the desired direction of current flow which must be outwards from the power winding 17 towards the current output terminal 30 of the current output circuit region 2. The synchronous rectifier unit 18 is able to achieve this.

Figure 6:
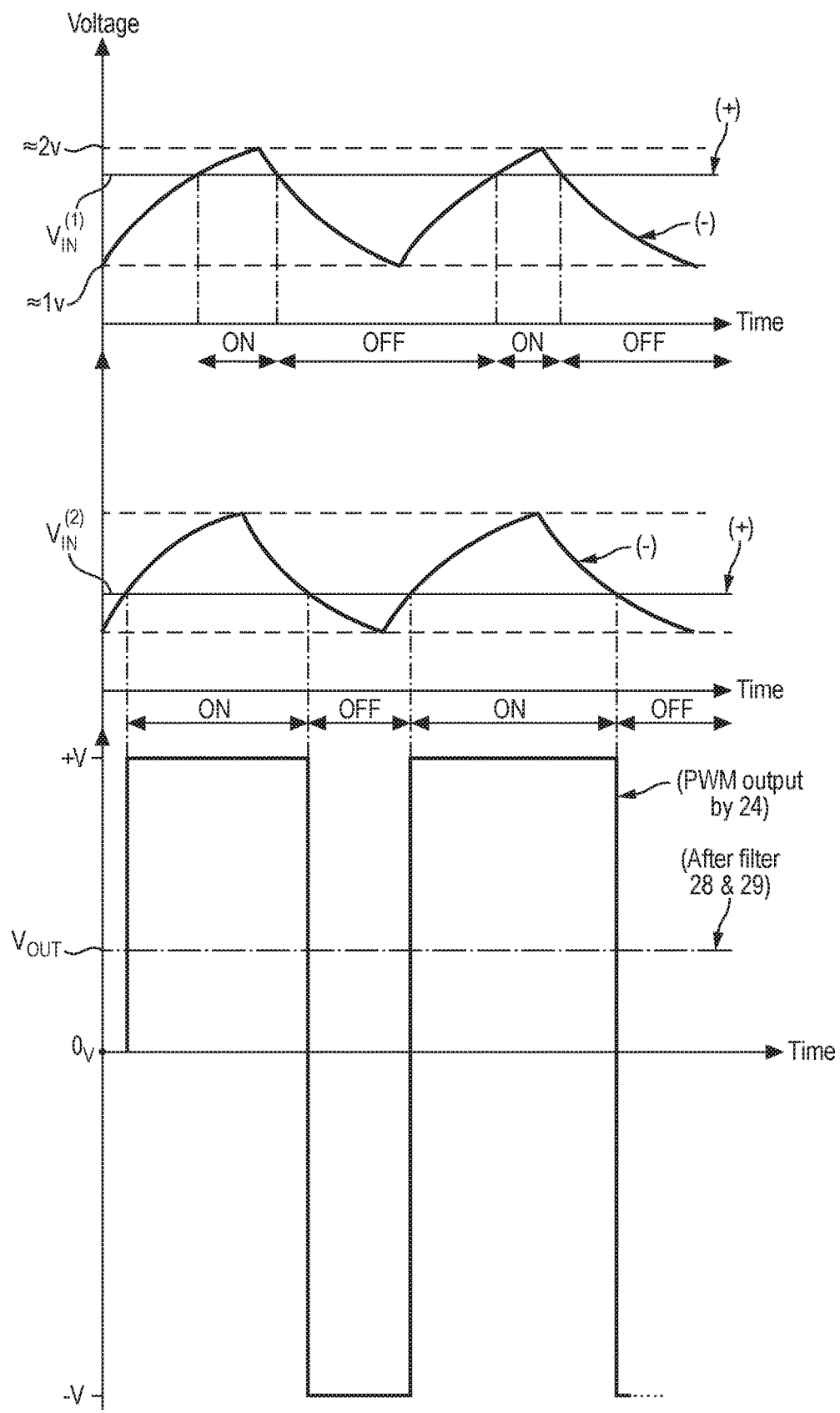
FIG. 6 schematically shows the voltage input signals to a comparator of the voltage regulator of an embodiment of the invention, together with a corresponding contemporaneous output voltage signal thereof.
Figure 7:
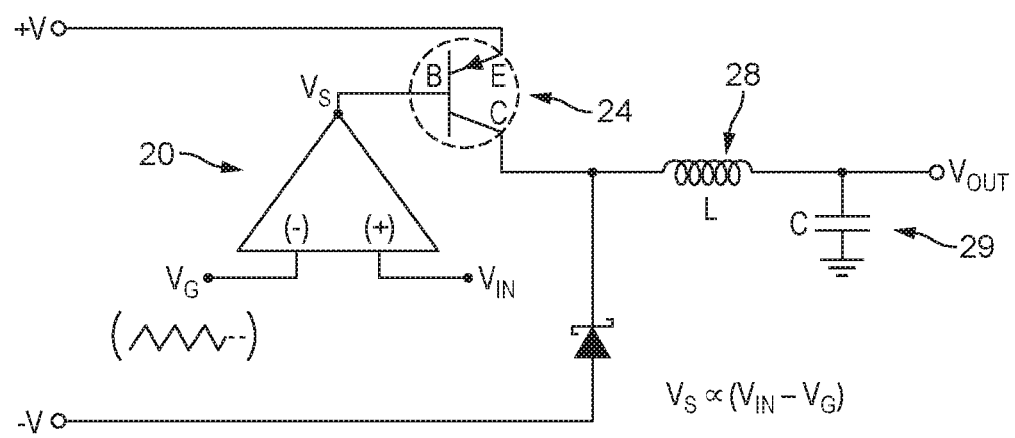
FIG. 7 schematically shows a circuit diagram illustrating certain elements of the voltage regulator of an embodiment of the invention related to the voltage input and output signals thereof as illustrated in FIG. 6.

FIGS. 6 and 7 relate to the operation of the PWM unit (20, 24) in conjunction with the current controller unit 22 of FIG. 3.

The PWM unit comprises a pair of voltage comparator units (50, 51) each comprising an inverting input port and a non-inverting input port. The non-inverting input port of each voltage comparator is electrically connected to the current input port 31 of the current output circuit region 2 so as to receive as input the voltage level provided at the current input port 31. The inverting input ports of each of the two voltage comparators are electrically connected to a respective one of the 2 opposite ends of the chopper control winding, 7B, via an intermediate respective RC filter (48, 49, 46, 47). This means that the inverting input of each voltage comparator is fed with a voltage signal derived from, and in synchrony with, a voltage generated at the chopper control winding 7B. This also is in synchrony with the drive signals provided by the chopper control winding 7B to the gates (G) of the FETs of the synchronous rectifier unit 18.

In particular, each voltage comparator of the PWM unit 20 is connected to a respective one end of the chopper control winding by a filter arrangement comprising a pair of resistors 46 forming a potential divider. One end resistor of the potential divider is connected to an end of the chopper control winding 7B while the other end resistor of the divide is connected to a 5 volt rail (other voltages may be used). The mid-point between these two end resistors is connected to the inverting input port of the respective voltage comparator (50, 51) and that mid-point is also connected to a grounded rail via a capacitor 47 of the filter, this provides an RC filter arrangement. The voltage level fed to the inverting input, by this RC filter, rises monotonically (exponential in form) when the chopper control winding 7B provides a positive voltage to the potential divider (46; 48) of the RC filter in question, and it falls exponentially when the chopper control winding provides a negative voltage to the potential divider (i.e. the capacitor 47 or 48 discharges in that case).

The result is a saw-tooth voltage ($V_G$) provided to the inverting input of each voltage comparator (and denoted "(−)"), of the form shown in FIG. 6. Simultaneously, the voltage ($V_{IN}$) at the current input port 31 is fed, via electrical connection and 23, to the non-inverting input of each voltage comparator (50, 51). Each voltage comparator generates at its output port a PWM signal ($V_S$) determined by the difference ($V_{IN}$-$V_G$) between its input voltages. The open collector outputs of the two comparators are out of phase due to being driven by opposite ends of chopper control winding 7B, and are combined to drive a base terminal of a PNP bipolar junction transistor switch 24, via a resistor 52 at twice the frequency of oscillation of the chopper control winding (7B). The operation of the switch 24 is that a small current leaving the base terminal thereof is amplified at the collector output of the switch. That is to say, the PNP transistor switch 24 is switched "on" when its base voltage is pulled low relative to its emitter voltage. FIG. 7 schematically illustrates the arrangement of the base terminal (B), the emitter terminal (E) and the collector terminal (C) of the PNP transistor switch 24 relative to one of the voltage comparators (50, 51) of the PWM unit and the electrical smoothing filter (28, 29). While the operation of the switch 24 is here described in terms of a PNP transistor, the PWM transistor 24 is not limited to being a PNP transistor, and in other arrangements it could be a Pch MOSFET. for instance.

A saw tooth voltage ($V_G$) is fed to the inverting input (−) of the voltage comparator which is in synchrony with the voltage from the chopper control winding 7B applied to gates of a respective one of the two pairs of FETs of the synchronous rectifier 18. The voltage ($V_{IN}$) from the current input port 31 of the current output circuit region 2 is simultaneously fed to the non-inverting input (+).

When $V_{in}$ is lower than $V_g$, the output voltage ($V_S$) is low and current is drawn from the base terminal of the PNP transistor switch 24. The positive-polarity voltage +V from the bridge rectifier unit 10 is fed to the emitter terminal (E) of the switch 24 and a current flows from the emitter terminal (E) to the collector terminal (C) of the switch (i.e. switch "on") when the voltage ($V_S$) at the base terminal is low. When the switch is "on", the positive voltage +V (less the voltage drop across switch 24) is applied to the input port of the electrical smoothing circuit (28, 29). The electrical smoothing circuit comprises an inductor 28 at an input port thereof, followed by a capacitor 29 connected in parallel with a grounded line. The output terminal of the inductor is connected in series with the current output port 30 of the current output circuit region 2, as is the non-grounded terminal of the capacitor 29 of the smoothing filter.

As shown in FIG. 6, when $V_{in}$ is higher than the saw tooth voltage ($V_G$), the output voltage ($V_S$) applied to the base terminal (B) of the switch 24 rises and the switch turns "off" and the current in inductor 28 is forced to flow via diode 26 from the negative voltage derived from the synchronous rectifier 80. The resulting PWM voltage is applied to the inductor 28 of the smoothing circuit. The resulting voltage on capacitor 29 is enough to drive the load plus the current control circuit 22. The voltage on the current control circuit 22 is the current input voltage 22 that controls the PWM. It will vary between the peak of the saw tooth waveform ($V_G$) at 100% PWM duty ratio (maximum sink load voltage) and the trough of the saw tooth waveform $V_G$ at 0% PWM duty ratio (maximum source load voltage).

The values of the resistors of the potential dividers (46, 48) and the values of the capacitors (47, 49) forming the RC filter at the inverting inputs of the differential amplifiers, are selected to determine an appropriate rate of rise and fall of the saw tooth waveform ($V_G$). For example, the RC filters may be arranged to allow a saw tooth voltage to rise/fall within the voltage range 1 volt<$V_G$<2 volts. The value of the voltage ($V_{IN}$) fed to the non-inverting inputs may therefore rise and fall within this voltage range. In response to a rise in $V_{IN}$, the switch 24 of the PWM unit 20 is in the "on" state for less time and the net effect is that the voltage input to the LC smoothing circuit (28, 29) has a reduced positive component from the bridge rectifier 10 relative to the negative voltage component from the synchronous rectifier 18. The smooth output ($V_{OUT}$) of the LC smoothing circuit (20, 20) falls in value (i.e. becomes less positive, becomes negative). The effect of this is to cause the voltage ($V_{IN}$) at the input port 31 of the current output circuit region 2, to fall and thus the voltage there is regulated of course, as this input voltage falls, then the duration of time for which the switch 24 is "on" rises, and a greater component of positive voltage from the bridge rectifier 10 is combined with the negative voltage from the synchronous rectifier 18. The net result, once smoothed by the LC electrical smoothing circuit (28, 29) is a rise in the output voltage ($V_{OUT}$) at the current output port 30 and, concurrently, at the current input port 31 where the input voltage ($V_{IN}$) rises in tandem. Thus, a feed-back loop is provided to regulate the output voltage ($V_{OUT}$) at the current output port 30, and to regulate the input voltage ($V_{IN}$) at the current input port, by monitoring the latter in a PWM arrangement.

At this point, it is instructive to consider an example of the operation and function of the current output circuit region 2 of FIG. 2, hereafter referred to as the current output apparatus for brevity, to assist in understanding a preferred embodiment of the invention.

To recap, the current output apparatus of FIG. 2 comprises a circuit configured for supplying electrical current to a source/active load 33 or a sink/passive load 32 connected to a current output terminal 30 and a current input terminal 31 of the apparatus. The source/active load comprises a load ('Active load') and an internal power source (providing a voltage $V_{source}$) of its own together with a passive load component, and as such is known in the art as a 'source load'. The sink/passive load comprises a load ('Passive load') without any a power source of its own, and as such is known in the art as a 'sink load'. Thus, a passive load is a special case of an active load in which one can conceptually consider that an internal power source exists but produces zero power. The apparatus of FIG. 2 is arranged to be connected to one or the other of the sink load and the source load, separately, however both types of load are shown in FIG. 2 for illustrating how each is to be connected to the current input/output terminals of the apparatus. In practice, only one of these two types of load would be so connected at any one time. It is to be noted that the negative polarity terminal of the internal voltage source of the 'Active load' 33 is to be connected to the current output terminal of the apparatus, with the passive component of the load being connected to the current input terminal of the apparatus.

This connection arrangement is to be contrasted with the connection arrangements for current output apparatus, such as shown in FIG. 1, in which the negative polarity terminal of the internal voltage source of the 'Active load' 33 is to be connected to the a grounded output terminal 35 of a current output apparatus, which is entirely a different arrangement to the output terminal 30 to be used for connection to a sink/passive load 32. Indeed, the diagram of FIG. 1 illustrates how it is impossible to use one such a circuit, unmodified, to connect to each of a sink load and a source load.

The current output apparatus circuit comprises a power supply unit (3, 17) connected to a voltage regulator unit (20, 23, 24) connected so that power may be supplied to the voltage regulator from the power supply unit. The voltage regulator is arranged to control the size and polarity of a voltage supplied to the first terminal (current output terminal 30') using voltages supplied by the power supply unit.

Figure 8:
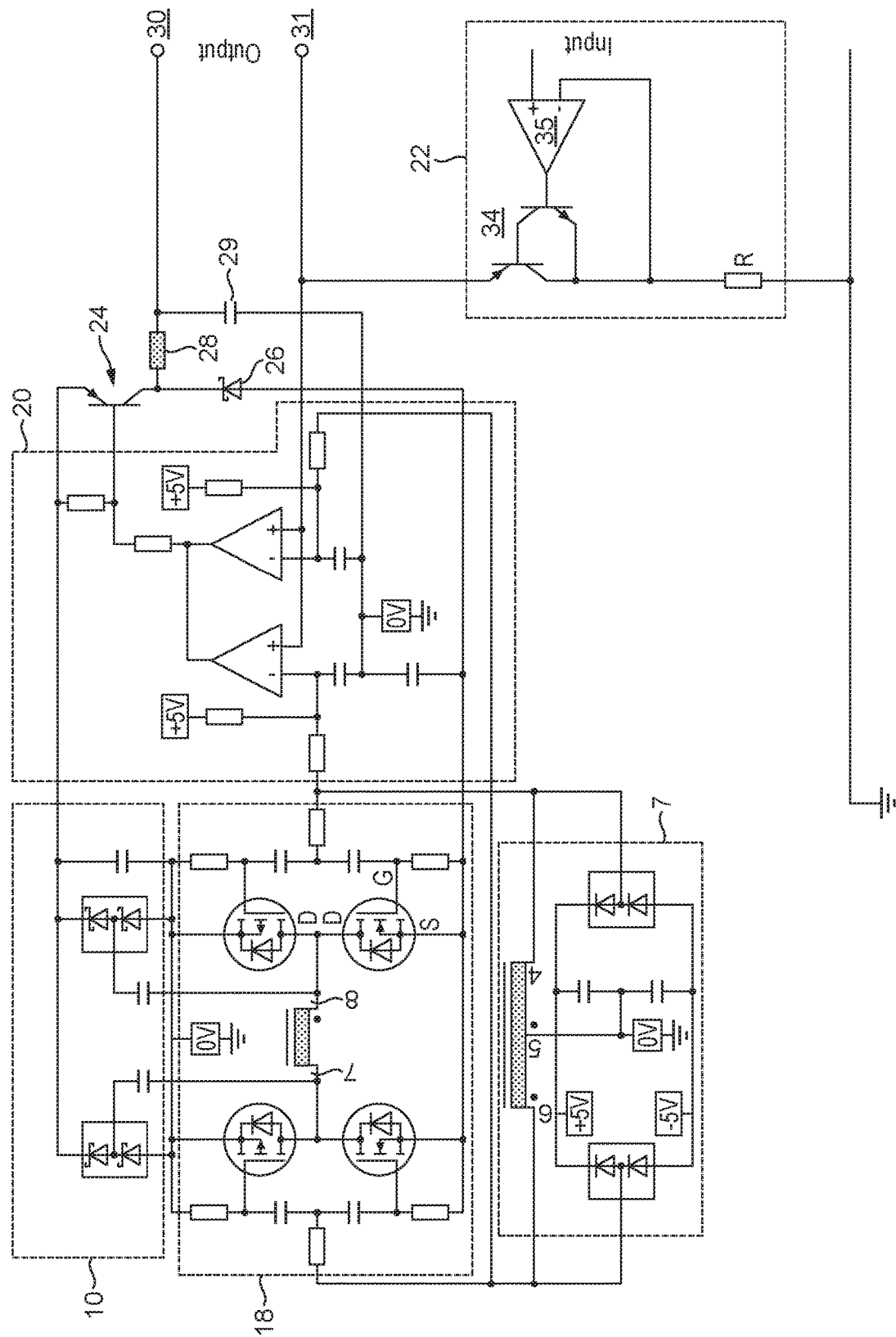
FIG. 8 schematically shows a current output apparatus according to an embodiment of the invention.
Figure 9:
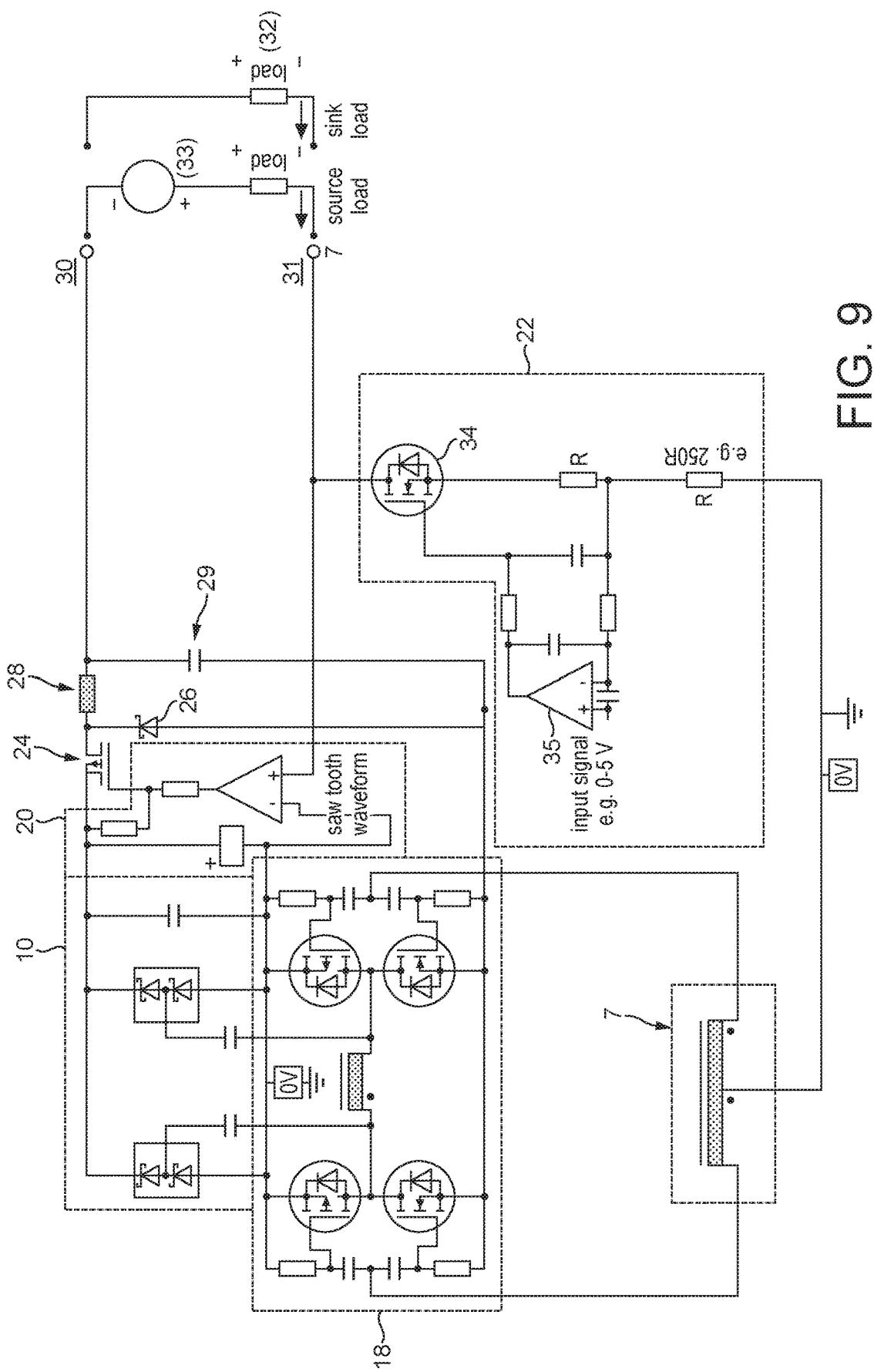
FIG. 9 schematically shows a current output apparatus according to an embodiment of the invention.

The current output apparatus further includes a current controller unit 22 comprising a variable impedance unit 34 in the form of a MOSFET, and an operational amplifier 35. A grounded non-inverting input terminal of the operational amplifier provides a reference voltage signal, and the voltage on the chopper is connected to the inverting input terminal of the operational amplifier (see FIG. 3) to maintain nominally 0 V on the chopper 5 (for transfer accuracy). The variable impedance unit 34 may be other than a MOSFET, and may be a NPN/PNP Darlington circuit (see FIG. 3), or a NPN Darlington circuit (not shown), or an Nch depletion mode MOSFET, or an NPN/Pch Pair circuit, or other suitable circuit providing controllably variable impedance to input current flowing through it. This may also apply, for example, in the alternative arrangement in which the signal chopper 5 is omitted. FIG. 8 illustrates an example. The input voltage would then be the product of the desired output current and the resistance (R; e.g. 250 Ohms) in the circuit part between the variable impedance unit 34 and the 0V (ground) terminal to which the variable impedance unit 34 is connected. A further example is shown in FIG. 9. The parts numbered in FIG. 8 and FIG. 9 are the same as those also shown in FIG. 3, such as items 7, 10, 18 and 20 which have the same content as items 7, 10, 18 and 20 described above with reference to FIG. 3.

The reference voltage signal is input to the non-inverting input of the two inputs of the comparator circuit 35 to provide a reference voltage signal for the comparator. The resistor (FIG. 3) is connected in series with both the variable impedance unit 34 and the current input terminal 31 of the current output apparatus to allow returned current to flow through it from the input terminal. The inverting input of the comparator is connected to a point following the resistor such that the resistor is connected between the variable impedance unit and inverting input terminal of the comparator to feed the voltage dropped across the resistor to the inverting input terminal for comparison with the reference voltage signal. The voltage dropped across the resistor is representative of the current delivered to the load via the current output/input terminals of the apparatus.

The current control unit 22 controls the impedance of the variable impedance unit 34 to control the current delivered to the chopper circuit 5 to a desired current level in response to the comparison of the reference voltage signal with the voltage dropped across the resistor.

The drain (or collector if a compound Darlington circuit) terminal of transistor 34 is connected to the current input terminal 31 which has small positive voltage (relative to 0V) to ensure a low power dissipation in the transistor circuit 34. The source (or emitter) terminal of the transistor is connected to the resistor such that the resistor develops a voltage drop across itself in proportion to the current passing through it. This voltage provides a feedback voltage signal for the comparator circuit. The output of the comparator circuit (differential amplifier 35) is connected to the gate terminal of the transistor circuit so as to apply to the gate terminal a control signal based on a comparison between the signals present at its inventing and non-inverting inputs contemporaneously. The impedance of transistor circuit is thereby adjusted according to the value of the control signal.

A pulse-width modulation unit (PWM) 20 controls the voltage supplied to the current output terminal 30. The PWM unit is arranged to supply to the current output terminal an electrical voltage which differs from the electrical voltage applied to the current input terminal 31, as necessary to ensure that the desired, predetermined magnitude of current is supplied to the load at the output terminal 30. The voltage difference ($\Delta V$) between the output 30 and input 31 terminals of the apparatus is given by:

For a source load:

$$\Delta V = V_{out} - V_{in} = (I_{out} R_{Load} - V_{source})$$

Where the resistance of the load is $R_{Load}$. Thus, $$V_{out} = V_{in} + (I_{out} R_{Load} - V_{source})$$

It is to be understood that although FIG. 2 shows both a 'source' load, and a 'sink' load, the invention is operable to apply, in use, separately to either a 'source' load or a 'sink' load as desired. In the former case the 'Passive load' would be absent from FIG. 2 and in the latter case the 'Active load' would be absent. Accordingly, in the case of a 'sink' load, the voltage difference ($\Delta V$) between the output and input terminals of the apparatus is given by:

For a sink load ($V_{source}=0$):

$$\Delta V = V_{out} - V_{in} = I_{out} R_{Load}$$

Where the resistance of the load is $R_{Load}$. Thus, $$V_{in} = V_{out} - I_{out} R_{Load}$$

The value of the voltage applied to the output terminal 30 ($V_{out}$) is regulated according to the voltage across the load resulting solely from the flow of supplied current through the resistance of the load ($I_{out} R_{Load}$) in the case of a 'sink' load, or due to that plus the additional voltage of the internal power source in the case of a 'source' load ($I_{out} R_{Load} - V_{source}$). In performing this voltage regulation, the current controller maintains the supplied current ($I_{out}$) at a desired, predetermined value. Accordingly, given that the values of ($I_{out} R_{Load}$) and ($V_{source}$) are not freely-variable parameters, but are constrained by the properties of the load. Thus, in order to supply the predetermined current to the load, the invention is arranged to vary the parameter $V_{out}$ so as to control the value of $V_{in}$, while maintaining $\Delta V$ substantially steady, or constant, as required by the load being supplied with current.

In order to maintain $\Delta V$ substantially steady, or constant, the PWM unit 20 is electrically connected to the current input terminal 31 of the apparatus thereby to sample the value of $V_{in}$, the voltage applied to the input terminal. With this information, the voltage regulator is arranged to supply a suitable voltage ($V_{out}$) to the output terminal 30 which results in a desired voltage ($V_{in}$) at the input terminal 31, by ensuring that the condition $V_{out} = \Delta V + V_{in}$ is substantially maintained.

Consequently, the 'excess voltage' ($V_{in}$) is controlled to be as low as desirable according to the relationship:

$$V_{in} = V_{out} + (V_{source} - I_{out} R_{Load}).$$

The term, ($V_{out}$) may be negative in sign because voltage is obtainable at the current output port 30, this negative voltage may reduce the net value of the excess voltage. The result enables $V_{in}$ to be low (or negative) so that less power is dissipated in the circuitry of the apparatus. This reduces the amount of current drawn from the external power supply 3A by enabling power to flow from the source load ($V_{source}$).

It is desirable to maintain a voltage value ($V_{in}$) at the input terminal, which is preferably less than about 20V, but greater than zero: i.e. $0V < V_{in} < 20V$. More preferably, it is desirable to maintain a voltage value ($V_{in}$) at the input terminal, which is preferably less than about 10V, but greater than zero: i.e. $0V < V_{in} < 10V$. Yet more preferably, it is desirable to maintain a voltage value ($V_{in}$) at the input terminal, which is preferably less than about 5V, but greater than zero: i.e. $0V < V_{in} < 5V$. Most preferably, it is desirable to maintain a voltage value ($V_{in}$) at the input terminal, which is preferably less than about 3V, but greater than zero: i.e. $0V < V_{in} < 3V$. A value of between about 1V to about 2V is desirable.

These voltage values result in a very low amount of power dissipation at the variable impedance unit 34 of the current controller. This means that power wastage is reduced and the resulting potential for damage to the variable impedance unit is also avoided, or minimised.

A consequence of this arrangement of control of the voltage ($V_{out}$) at the output terminal 30, is that it is possible to use the same apparatus to supply current to either a 'source' load or a 'sink' load, by making an appropriate choice of the output voltage value provided by the PWM unit 20, while still maintaining the advantageously low input voltage value ($V_{in}$).

Indeed, when connected to a 'source' load, the PWM unit 20 may, if suitable, control the voltage ($V_{out}$) at the output terminal 30 such that it has negative polarity. As a result of this negative polarity at the current output terminal, power is able to be drawn from the power source within the source load, by the apparatus, into the current output terminal 30 rather than into the current input terminal 31. Electrical current ($I_{out}$) flows out from the current output terminal 30 to the current input terminal 31 through the source load, however, because the current is 'positive' yet the voltage applied to the current output terminal 30 is 'negative' the resulting power ($P_{out} = I_{out} V_{out}$) output from the current output terminal 30 is negative (i.e. $I_{out} > 0$, but $V_{out} < 0$). This means that power does not flow out of the current output terminal 30 but, instead, flows into the current output terminal 30 from the power supply ($V_{source}$) of the source load. Power from the source load flows into the power supply unit 3, which powers the apparatus, rather than being dissipated in the variable impedance unit 34, as would otherwise be the case. This reduces the amount or current drawn from the external power supply unit 3A.

The PWM unit 20 is operable to vary the magnitude of the voltage ($V_{out}$) supplied to the first terminal 30 by a process of mixing two separate DC voltages of opposite polarity (i.e. one −ve, the other +ve) in variably, controlled proportions by a process of pulse-width modulation (PWM). By ensuring that the proportion of the DC current drawn from the voltage of −ve polarity exceeds the proportion of DC current drawn from the voltage of +ve polarity, the net result of the combination is an effective output voltage ($V_{out}$) that is negative in polarity but of variable magnitude (adjustable as desired).

To this end, in preferred embodiments, the voltage regulator comprises a switching unit arranged to supply to the voltage regulator an electrical voltage alternately switched between the positive polarity DC voltage and the negative polarity DC voltage, with the result subsequently smoothed. The voltage regulator is arranged to supply to the smoothing circuit (28, 29) an electrical voltage of positive polarity and then of electrical voltage of negative polarity alternately, for selected respective time periods. The smoothing circuit outputs the result to the first terminal ('OUT'), the current output terminal. In this way, the magnitude of the voltage output ($V_{out}$) by the voltage regulator is controlled by varying the proportion of time that the smoothing circuit is connected to the positive-polarity DC voltage or the negative-polarity DC voltage. A smoothed electrical voltage ($V_{out}$) of continuously controllable magnitude and polarity is thereby supplied to the current output terminal.

The positive-polarity and negative-polarity DC voltages are generated as concurrent outputs of a rectifier unit 10 and a synchronous rectifier unit 18 FIG. 2 and FIG. 3. Each rectifier is fed by a secondary transformer winding 17 of a power transformer unit of which a transformer drive 3C provides the transformer primary winding part.

It is to be noted that although embodiments of the current output apparatus of the invention described above with reference to FIGS. 2 to 9, relate to a current output apparatus in the form of a current transfer apparatus, the invention is not limited to a current transfer apparatus. For example, invention is applicable to the output of current representing any signal of measurement from an isolated input area.

That is to say, in the examples illustrated in FIGS. 2 to 9, the signal being output by the current output apparatus 2 represents a value of a current signal generated in the isolated input region 1 and transferred to the output region 2 where the current output apparatus outputs the result. The arrangement is a 'current follower' arrangement in which the chopper circuits (6, 7) of the input region 1 and the output region 2 are employed for the purposes of transferring the signal (representing a value of a current) from the input region to the output region.

Figure 10:
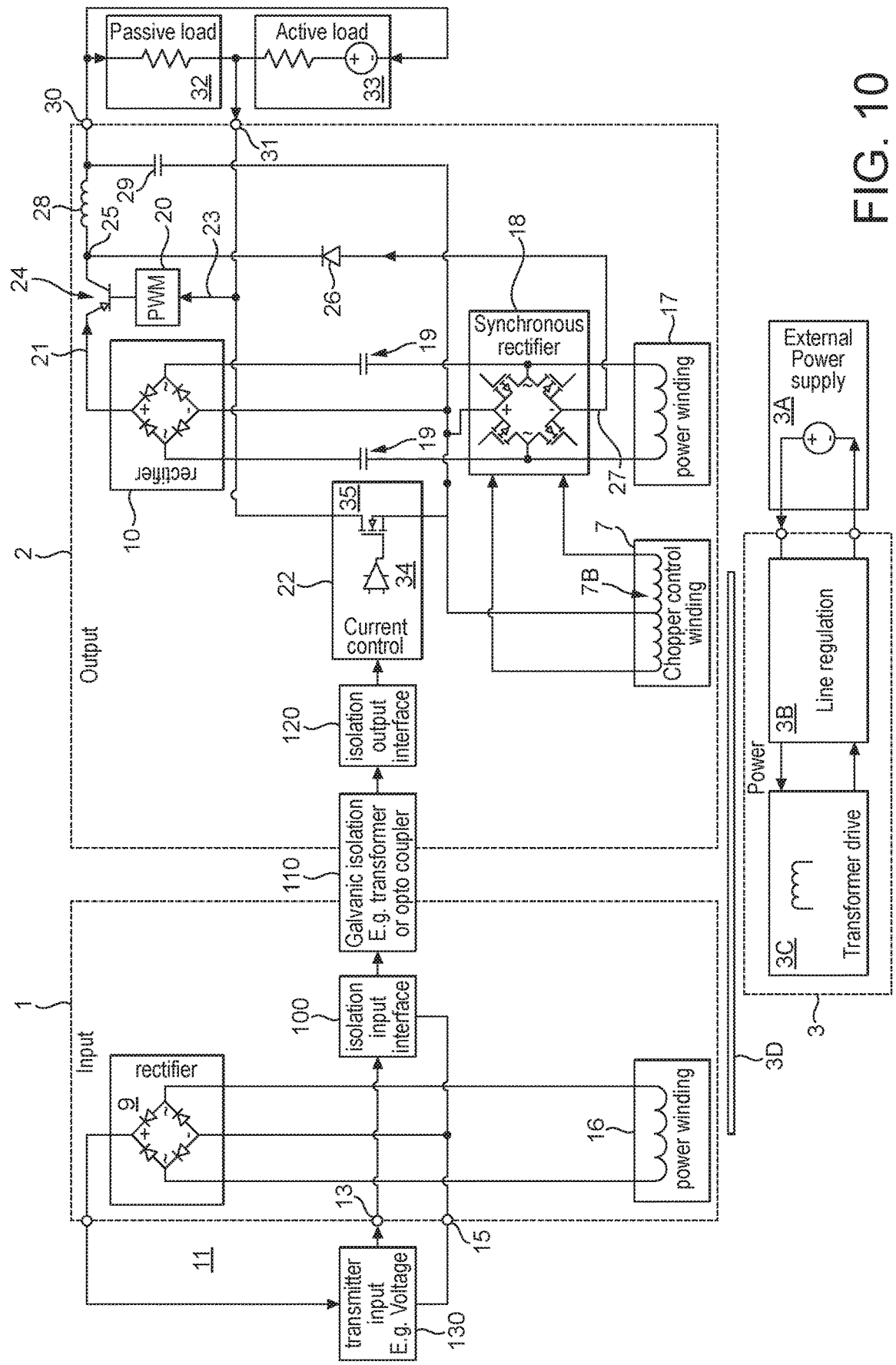
FIG. 10 schematically shows a current output apparatus according to an embodiment of the invention.

However, in other applications of the current output apparatus of the invention, the signal being transferred may represent something other than a value of a current in the input region 1. Means other than chopper circuits may be used to transfer that signal from the input region 1 to the output region 2. FIG. 10 schematically shows an example of this more general application. In FIG. 10, as compared to FIG. 2, the chopper circuit 6 of the input region 1 is replaced with an isolation input interface 100, which may be a chopper or may be an electro-optical unit for outputting an optical signal conveying the value of a quantity (e.g. current, voltage etc.) to be transferred to the output region 2. In FIG. 10, as compared to FIG. 2, the chopper circuit 5 of the output region 2 is replaced with an isolation input interface 120, which may be a corresponding chopper or may be a corresponding electro-optical unit for receiving the aforesaid optical signal conveying the value of a quantity (e.g. current, voltage etc.) transferred to the output region 2. The transformers (4, 5B, 6B) of FIG. 2 are replaced with a galvanic isolation unit 110, which may be a transformer (per FIG. 2) or may be the means for transferring the aforesaid optical signals.

In FIG. 10, as compared to FIG. 2, the current sink input 11, or alternatively the current source input 12 as appropriate, is replaced by a 'transmitter unit' 130. This transmitter unit may be any unit with a signal to transmit from the input region to the output region via the galvanically isolated transfer means (110). In FIG. 2, the 'transmitter unit' 130 happens to be current sink input 11, or alternatively the current source input 12 as appropriate. In other embodiments, the 'transmitter unit' 130 may be a transmitter of a voltage signal, rather than a current signal.

Although a few preferred embodiments of the present invention have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A current output apparatus adapted for electrical connection to a load to output an electrical current thereto, comprising:
    a current output terminal for connecting to a first terminal of the load to pass an electrical current thereto;
    a current input terminal for connecting to a second terminal of the load to receive said electrical current returned from the load;
    a voltage regulator operable to supply to the current output terminal an electrical voltage regulated to differ from an electrical voltage applied to the current input terminal by an amount sufficient to cause said electrical current to flow from the current output terminal to the current input terminal via the load;
    wherein the voltage regulator is operable and arranged to supply to the current output terminal an electrical voltage of positive polarity or of negative polarity for supplying said electrical current to a load presenting to the current output terminal a voltage of positive polarity or of negative polarity, respectively; and
    a synchronous rectifier arranged to rectify an AC voltage signal supplied by a first transformer winding coupled thereto, and to supply the rectified voltage to the voltage regulator;
    wherein the synchronous rectifier comprises field-effect transistors (FETs) and a control unit arranged to synchronously control the conductivity of the transistors to supply to the voltage regulator a DC electrical voltage of negative polarity.

2. A current output apparatus according to claim 1 operable to supply to the current output terminal an electrical voltage of positive polarity when the load is a sink load and to supply to the current output terminal an electrical voltage of negative polarity when the load is a source load.

3. A current output apparatus according to claim 1 in which the control unit includes a second transformer winding coupled to the gate terminals of said FETs of the synchronous rectifier, wherein the polarity of voltage at the second transformer winding is controllable for applying a positive-polarity voltage to the gate terminals of FETs of the synchronous rectifier coupled to an end of the first transformer winding when that end has a negative-polarity voltage such that a negative-polarity voltage of the first transformer winding is presented to said voltage regulator.

4. A current output apparatus according to claim 1 including a further rectifier electrically coupled to said first transformer winding and arranged to rectify an AC voltage signal supplied by said first transformer winding coupled thereto, and to supply the rectified voltage to the voltage regulator as a DC electrical voltage of positive polarity.

5. A current output apparatus according to claim 1 including a current controller electrically connected to the current input terminal and arranged for regulating the voltage at the current input terminal such that said the magnitude of the returned electrical current substantially matches a predetermined magnitude.

6. A current output apparatus according to claim 5 wherein the voltage regulator is electrically connected to the current input terminal thereby to receive the voltage thereat as an input signal, and to regulate the voltage supplied to the current output terminal according to the voltage at the current input terminal, such that the magnitude of the returned electrical current substantially matches said predetermined magnitude.

\* \* \* \* \*